United States Patent
Xing

(10) Patent No.: US 10,447,832 B2
(45) Date of Patent: Oct. 15, 2019

(54) PORTABLE MOBILE PHONE BRACKET

(71) Applicant: Haoyu Xing, Shenzhen (CN)

(72) Inventor: Haoyu Xing, Shenzhen (CN)

(*) Notice: Subject to any disclaimer, the term of this patent is extended or adjusted under 35 U.S.C. 154(b) by 0 days.

(21) Appl. No.: 15/777,217

(22) PCT Filed: Nov. 20, 2015

(86) PCT No.: PCT/CN2015/095098
§ 371 (c)(1),
(2) Date: May 18, 2018

(87) PCT Pub. No.: WO2017/084081
PCT Pub. Date: May 26, 2017

(65) Prior Publication Data
US 2018/0352064 A1 Dec. 6, 2018

(51) Int. Cl.
*H04M 1/04* (2006.01)
*F16M 13/02* (2006.01)
*F16M 11/10* (2006.01)
*F16M 11/38* (2006.01)
*F16M 13/00* (2006.01)

(52) U.S. Cl.
CPC .............. *H04M 1/04* (2013.01); *F16M 11/10* (2013.01); *F16M 11/38* (2013.01); *F16M 13/00* (2013.01); *F16M 13/02* (2013.01); *F16M 2200/041* (2013.01); *F16M 2200/08* (2013.01)

(58) Field of Classification Search
CPC .... F16M 2200/08; F16M 13/02; F16M 11/10; F16M 11/16; F16M 11/105; F16M 11/12; H04M 1/04; H04M 1/11; A47G 1/24; Y10S 248/923; A47B 23/04; A47B 23/042; A47F 5/12

USPC .... 248/451, 371, 372.1, 919–923, 133, 455, 248/457, 688
See application file for complete search history.

(56) References Cited

U.S. PATENT DOCUMENTS

| | | | | |
|---|---|---|---|---|
| 7,516,933 | B2* | 4/2009 | Moon | H04M 1/04 248/441.1 |
| 8,534,635 | B2* | 9/2013 | Yang | F16M 11/10 248/454 |
| 9,022,341 | B2* | 5/2015 | Radmard | F16M 11/00 248/558 |
| 2004/0178314 | A1* | 9/2004 | Chen | F16M 11/08 248/349.1 |

(Continued)

FOREIGN PATENT DOCUMENTS

| CN | 201992281 U | 9/2011 |
|---|---|---|
| CN | 203549306 U | 4/2014 |

(Continued)

OTHER PUBLICATIONS

Haofu Huang, The International Searching Authority written comments, Jul. 2016, CN.

*Primary Examiner* — Christopher Garft

(57) ABSTRACT

The present disclosure discloses a portable mobile phone bracket which includes a base. A supporting plate is arranged on the base. The base is connected to the supporting plate through a connection portion. A weight reducing structure is arranged on the base. In this way, weight of the base is reduced and then weight of the entire bracket is reduced, thereby facilitating use and carrying of the bracket for the user. Meanwhile, production of the bracket is simpler and more materials are saved.

11 Claims, 5 Drawing Sheets

(56) References Cited

U.S. PATENT DOCUMENTS

| | | | | |
|---|---|---|---|---|
| 2006/0032998 A1* | 2/2006 | Depay | ................... | F16M 11/10 248/291.1 |
| 2006/0038104 A1* | 2/2006 | Choi | ................... | F16M 11/041 248/370 |
| 2007/0018000 A1* | 1/2007 | Jeun | ................ | H04M 1/04 235/486 |
| 2007/0029457 A1* | 2/2007 | Baek | ................ | F16C 11/10 248/372.1 |
| 2007/0040077 A1* | 2/2007 | Baek | ................ | F16M 11/10 248/133 |
| 2008/0061205 A1* | 3/2008 | Park | ................ | H04M 1/04 248/291.1 |
| 2008/0315059 A1* | 12/2008 | Kaneko | ............... | G06F 1/1601 248/425 |
| 2014/0138419 A1 | 5/2014 | Minn et al. | | |

FOREIGN PATENT DOCUMENTS

| | | |
|---|---|---|
| CN | 204272220 U | 4/2015 |
| CN | 204399020 U | 6/2015 |
| CN | 204652486 U | 9/2015 |
| CN | 205447145 U | 8/2016 |
| JP | 2001313709 A | 11/2001 |

\* cited by examiner

PORTABLE MOBILE PHONE BRACKET

TECHNICAL FIELD

The present disclosure relates to the field of machines, and more particularly to a portable mobile phone bracket.

BACKGROUND

With the economic progress, electronic products are more and more widely used and especially, large-screen mobile phones and tablet personal computers are popular. When people perform entertainments such as music video, because devices are held with hands to regulate a distance and an angle between a screen and eyes, it is easy to cause hand fatigue and even injure hand joints after long-term use.

The prior art discloses a mobile phone bracket. A bottom plate is connected to a bottom end of a supporting plate for placing a mobile phone through a foot shaft. A supporting rod used to regulate an inclined angle of the supporting plate is connected between the supporting plate and the bottom plate. A transverse barrier is arranged below the supporting plate. During to use, the mobile phone is placed on the supporting plate, and is located and fixed through the barrier. The inclined angle of the supporting plate is regulated by regulating a supporting angle of the supporting rod.

In the prior art, because an integrally-formed plastic plate is used as a base, weight of the base is heavy, and the mobile phone bracket is inconvenient in carrying and use.

SUMMARY

The purpose of the present disclosure is to provide a portable mobile phone bracket capable of reduce weight of a base.

The purpose of the present disclosure is achieved by the following technical solution:

A portable mobile phone bracket comprises a base. A supporting plate is arranged on the base. The base is connected to the supporting plate through a connection portion. A weight reducing structure is arranged on the base.

Further, the base comprises an upper cover and a lower cover. The weight reducing structure comprises a first weight reducing hole formed in the upper cover and a second weight reducing hole formed in the lower cover. Through design of the upper cover and the lower cover, weight reducing treatment is made conveniently for the upper cover and the lower cover. Meanwhile, molding and processing of the weight reducing structures are convenient. Moreover, the upper cover and the lower cover adopt weight reducing holes. Thus, materials are saved to achieve the purpose of reducing the weight of the base, and good supporting and fixing effects are provided for the bracket to enhance radial anti-pressure capability of the base.

Further, a first clamping groove connected to the connection portion is formed in the upper cover. The weight reducing structure comprises a first weight reducing groove formed in a back surface of the upper cover. A position of the first weight reducing groove corresponds to a position of the first clamping groove. In this way, the first clamping groove is formed so that assembly and disassembly of the connection portion and the base are more convenient and simple. Meanwhile, the first weight reducing groove is formed in the corresponding back surface of the first clamping groove, so that processing and molding of the base are very convenient, a requirement of reducing the weight of the base is achieved and carrying and use are more convenient.

Further, the weight reducing structure comprises a second weight reducing groove formed in the upper cover and a third weight reducing groove formed in the lower cover. The second weight reducing groove is matched with the third weight reducing groove. The second weight reducing groove circles the upper cover once. The third weight reducing groove circles the lower cover once. In this way, the weight reducing grooves are formed in the upper cover and the lower cover, so that the materials are saved, the weight is reduced and carrying and use of the user are convenient.

Further, the second weight reducing hole is provided with a first protrusion axially extending. The first protrusion is provided with a first clamping ring. The first protrusion is matched with the third weight reducing groove to clamp the upper cover. Such arrangement facilitates assembly and disassembly of the base.

Further, the third weight reducing groove is provided with a second protrusion. The second protrusion radially extends. The second weight reducing groove is provided with a second clamping groove for limiting. The second clamping groove is matched with the second protrusion. In this way, the second clamping groove is matched with the second protrusion so as to limit the lower cover, so that accurate positioning and installation of the upper cover and the lower cover are convenient and the upper cover and the lower cover are fixed more firmly.

Further, the second weight reducing groove is provided with a first reinforcing rib used to strengthen supporting. The second weight reducing hole is provided with a second reinforcing rib used to strengthen supporting. The second reinforcing rib is connected to the third weight reducing groove. Such arrangement may better enhance supporting of the base so that the base is more durable and is difficult to damage.

Further, the second reinforcing rib is provided with a third protrusion for limiting. The third protrusion is configured as an arc. In this way, movement of mobile phones or tablet personal computers placed on the bracket is well limited. Moreover, processing is very simple. Meanwhile, arc design of the third protrusion strengthens the supporting, thereby effectively preventing the third protrusion from being easily broken and enhancing durability of the base.

Further, screw holes are formed in the third weight reducing groove. The screw holes are arranged at intervals. Location pillars matched with the screw holes are arranged on the second weight reducing groove. The location pillars are arranged on the first reinforcing rib. In this way, the upper cover and the lower cover are fixed more firmly. Meanwhile, assembly and disassembly of the upper cover and the lower cover are convenient through screw fixation, so that the base is more durable.

Further, a non-slip pad is arranged on the base. In this way, because the non-slip pad is arranged on the base, when the bracket is placed, it is difficult for the bracket to slide and abrade, so that placement of the bracket is more stable and the bracket is prevented from being damaged.

In the present disclosure, because the weight reducing structure is arranged on the base, the weight of the base is reduced and then the weight of the entire bracket is reduced, thereby facilitating use and carrying of the bracket for the user. Meanwhile, production of the bracket is simpler and more materials are saved.

In the figures: 1 base; 11 weight reducing structure; 12 non-slip pad; 2 upper cover; 21 first weight reducing hole; 22 first clamping groove; 23 first weight reducing groove; 24 second weight reducing groove; 241 first reinforcing rib; 25 second clamping groove; 26 location pillar; 3 lower cover; 31 second weight reducing hole; 311 first protrusion; 312 first clamping ring; 313 second reinforcing rib; 32 third weight reducing groove; 321 second protrusion; 33 third protrusion; 34 screw hole; 4 connection portion; and 5 supporting plate.

DETAILED DESCRIPTION

The present disclosure will be further described below in combination with the drawings and preferred embodiments.

Figure 1:
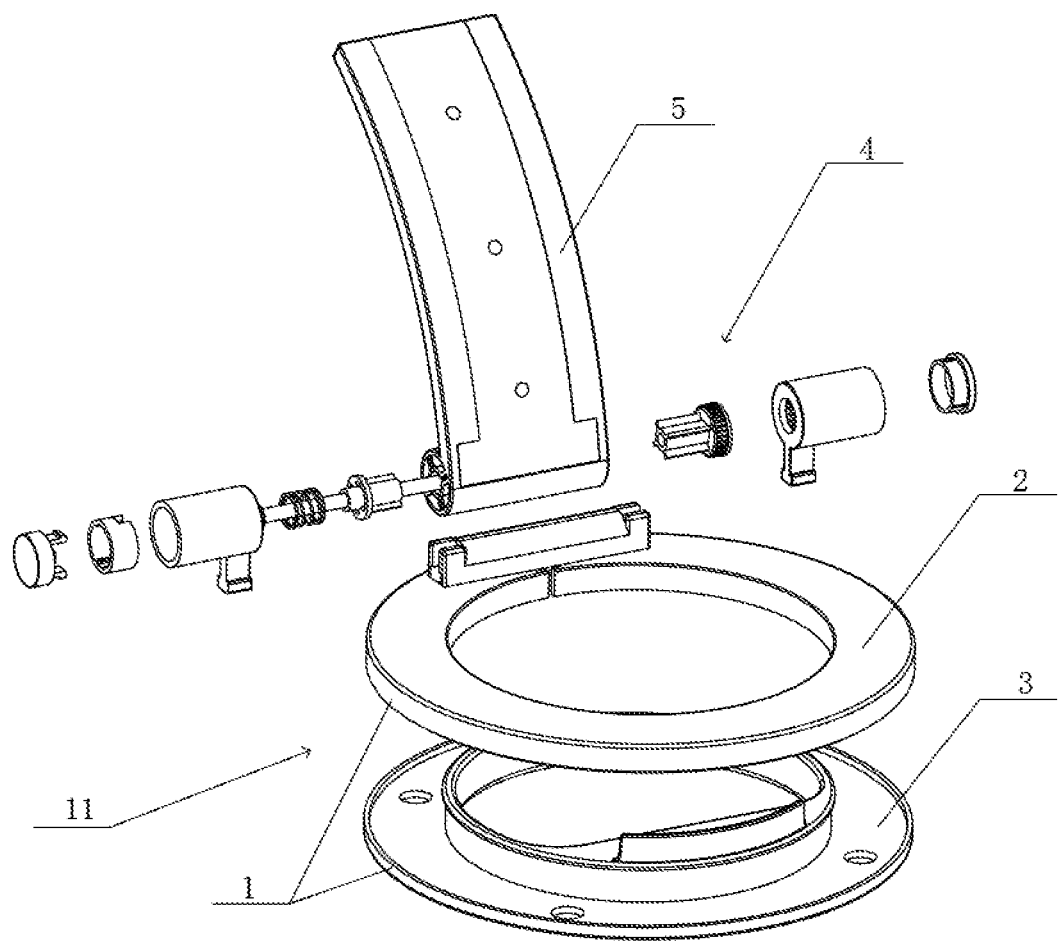
FIG. 1 is an exploded diagram of a portable mobile phone bracket according to an embodiment of the present disclosure.
Figure 2:
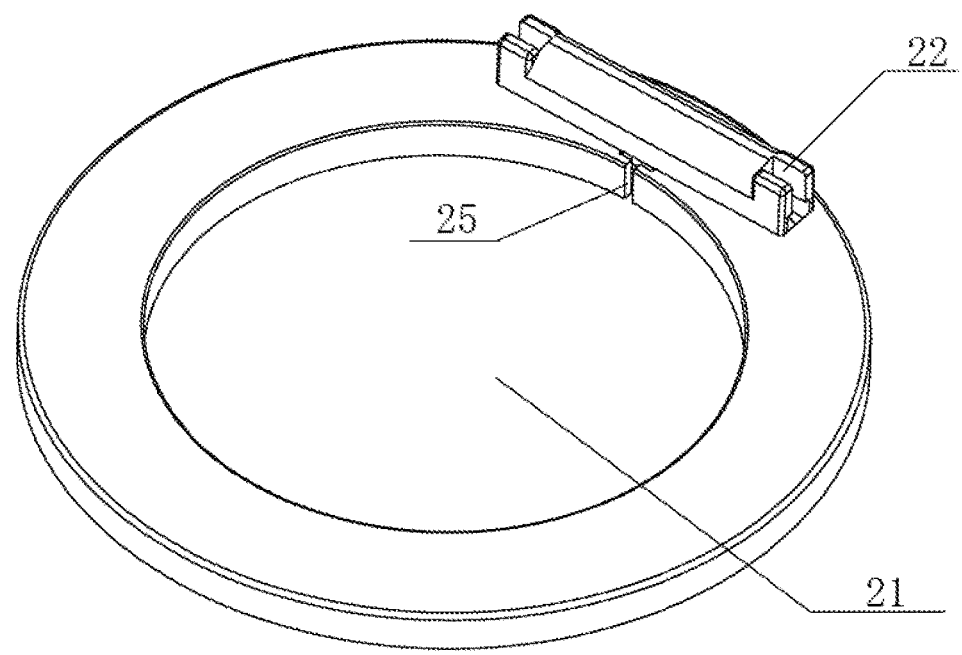
FIG. 2 is a three-dimensional diagram of an upper cover according to an embodiment of the present disclosure.
Figure 3:
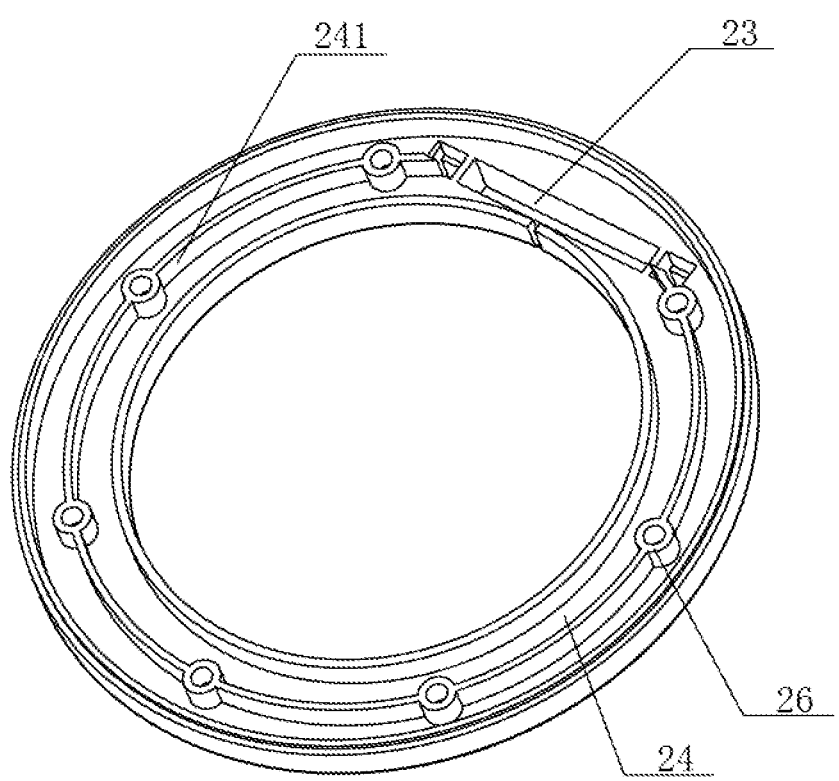
FIG. 3 is a three-dimensional diagram of an inner portion of an upper cover according to an embodiment of the present disclosure.
Figure 4:
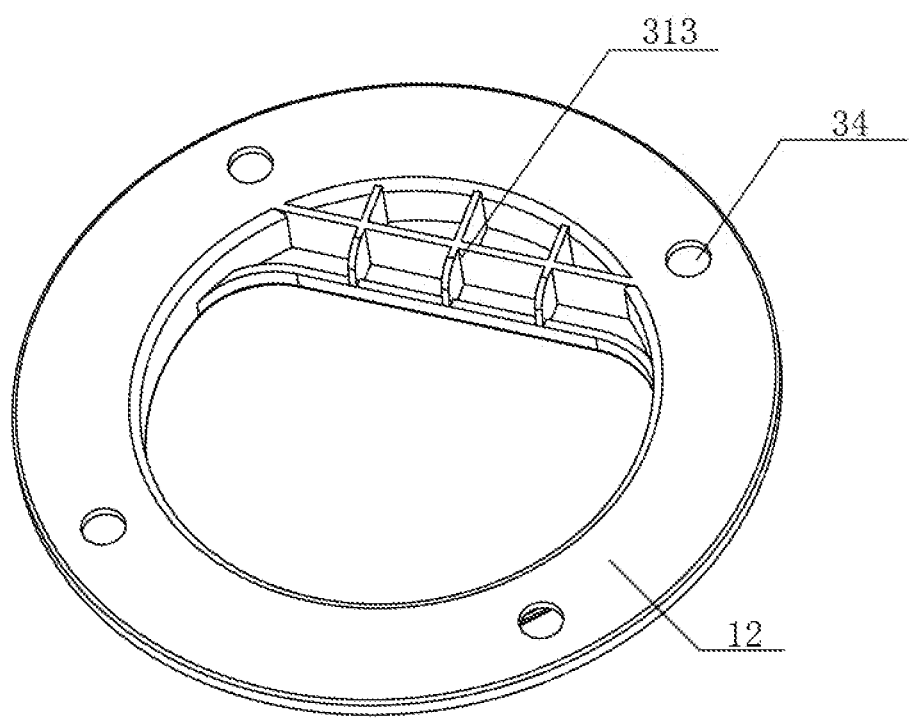
FIG. 4 is a three-dimensional diagram of a lower cover according to an embodiment of the present disclosure.
Figure 5:
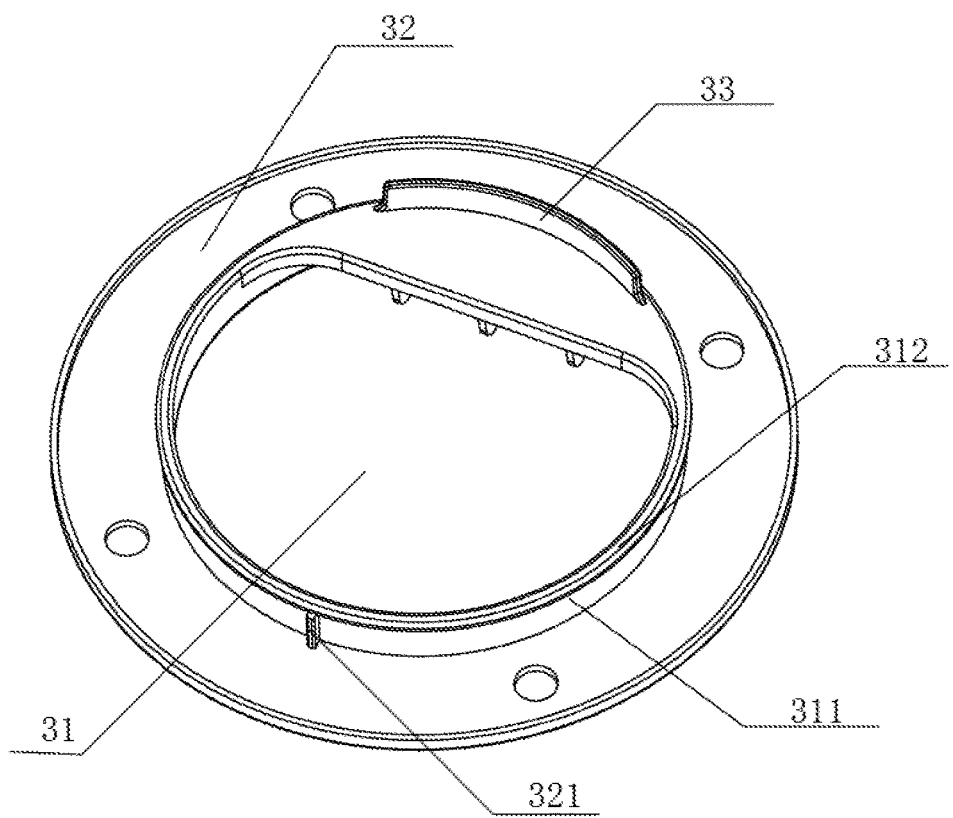
FIG. 5 is a three-dimensional diagram of an inner portion of a lower cover according to an embodiment of the present disclosure.

Embodiments of the present disclosure disclose a portable mobile phone bracket. As shown in FIG. 1, the portable mobile phone bracket comprises a base 1. A supporting plate 5 is arranged on the base 1. The base 1 is connected to the supporting plate 5 through a connection portion 4. A weight reducing structure 11 is arranged on the base 1. Because the weight reducing structure 11 is arranged on the base 1, the weight of the base 1 is reduced and then the weight of the entire bracket is reduced, thereby facilitating use and carrying of the bracket for the user. Meanwhile, production of the bracket is simpler and more materials are saved.

As shown in FIG. 1 to FIG. 5, the base 1 comprises an upper cover 2 and a lower cover 3. The weight reducing structure 11 comprises a first weight reducing hole 21 formed in the upper cover 2 and a second weight reducing hole 31 formed in the lower cover 3 so that the upper cover 2 and the lower cover 3 formed a circular ring structure. Through such design for the base 1, weight reducing treatment is made conveniently for the upper cover 2 and the lower cover 3. Meanwhile, molding and processing are convenient. Moreover, the upper cover 2 and the lower cover 3 adopt weight reducing holes. Thus, materials are saved to achieve the purpose of reducing the weight of the base 1, and good supporting and fixing effects are provided for the bracket to enhance radial anti-pressure capability of the base 1. A first clamping groove 22 connected to the connection portion 4 is formed in the upper cover 2. Through such arrangement, assembly and disassembly of the connection portion 4 and the base 1 are more simple and convenient. The weight reducing structure 11 comprises a first weight reducing groove 23 formed in a back surface of the upper cover 2. A position of the first weight reducing groove 23 corresponds to a position of the first clamping groove 22. In this way, processing and molding of the base 1 are very convenient, a requirement of reducing the weight of the base 1 is achieved and carrying and use are more convenient. The weight reducing structure 11 comprises a second weight reducing groove 24 formed in the upper cover 2 and a third weight reducing groove 32 formed in the lower cover 3. The second weight reducing groove 24 is matched with the third weight reducing groove 32. The second weight reducing groove 24 circles the upper cover 2 once. The third weight reducing groove 32 circles the lower cover 3 once. The weight reducing grooves are formed in the upper cover 2 and the lower cover 3, so that the materials are saved, the weight is reduced and carrying and use of the user are convenient. The second weight reducing hole 31 is provided with a first protrusion 311 axially extending. The first protrusion 311 is provided with a first clamping ring 312. The first clamping ring 312 is matched with the third weight reducing groove 32 to clamp the upper cover 3. Such arrangement facilitates assembly and disassembly of the base 1. The third weight reducing groove 32 is provided with a second protrusion 321. The second protrusion 321 radially extends. The second weight reducing groove 24 is provided with a second clamping groove 25 for limiting. The second clamping groove 25 is matched with the second protrusion 321 so as to limit the lower cover 3, so that accurate positioning and installation of the upper cover 2 and the lower cover 3 are convenient and the upper cover 2 and the lower cover 3 are fixed more firmly.

The second weight reducing groove 24 is provided with a first reinforcing rib 241 used to strengthen supporting. The second weight reducing hole 31 is provided with a second reinforcing rib 313 used to strengthen supporting. The second reinforcing rib 313 is connected to the third weight reducing groove 32. Such arrangement may better enhance supporting of the base 1 so that the base 1 is more durable and is difficult to damage. The second reinforcing rib 313 is provided with a third protrusion 33 for limiting. The third protrusion 33 is configured as an arc. In this way, movement of mobile phones or tablet personal computers placed on the bracket is well limited. Moreover, processing is very simple. Meanwhile, arc design of the third protrusion 33 strengthens the supporting, thereby effectively preventing the third protrusion 33 from being easily broken and enhancing durability of the base 1.

Screw holes 34 are formed in the third weight reducing groove 32. The screw holes 34 are arranged at intervals. Four screw holes 34 are arranged so as to play a good fixation effect. Location pillars 26 matched with the screw holes 34 are arranged on the second weight reducing groove 24. The location pillars 26 are arranged on the first reinforcing rib 241. In this way, the upper cover 2 and the lower cover 3 are fixed more firmly. Meanwhile, assembly and disassembly of the upper cover 2 and the lower cover 3 are convenient through screw fixation, so that the base 1 is more durable. A non-slip pad 12 is arranged on the base 1. The non-slip pad 12 coves the lower cover 3, or fills the screw holes 34 and is slightly protruded from an outer surface of the lower cover 3. In this way, the non-slip pad 12 is beautiful and has a good non-slip effect. Because the non-slip pad 12 is arranged on the base 1, when the bracket is placed, it is difficult for the bracket to slide and abrade, so that placement of the bracket is more stable and the bracket is prevented from being damaged.

The above contents are further detailed descriptions of the present disclosure in combination with specific preferred embodiments. However, the concrete implementation of the present disclosure shall not be considered to be only limited to these descriptions. For those ordinary skilled in the art to which the present disclosure belongs, several simple deductions or replacements may be made without departing from the conception of the present disclosure, all of which shall be considered to belong to the protection scope of the present disclosure.

The invention claimed is:

1. A portable mobile phone bracket, comprising a base, wherein a supporting plate is arranged on the base; the base is connected to the supporting plate through a connection portion; and a weight reducing structure is arranged on the base; the base comprises an upper cover and a lower cover, the weight reducing structure comprises a first weight reducing hole formed in the upper cover and a second weight reducing hole formed in the lower cover; a first weight reducing groove formed in the upper cover and a second weight reducing groove formed in the lower cover; the first weight reducing groove is matched with the second weight reducing groove; the first weight reducing groove circles the upper cover once; and the second weight reducing groove circles the lower cover once; and wherein the first weight reducing groove is provided with a first reinforcing rib used to strengthen supporting; a second reinforcing rib is formed on the lower cover and the second reinforcing rib is used to strengthen supporting:

and wherein the second weight reducing groove is provided with a second protrusion; the second protrusion radially extends; the second weight reducing groove is provided with a second clamping groove matched with the second protrusion.

2. The portable mobile phone bracket according to claim 1, wherein a first clamping groove connected to the connection portion is formed in the upper cover; the weight reducing structure comprises a third weight reducing groove formed in a back surface of the upper cover; and a position of the third weight reducing groove corresponds to a position of the first clamping groove.

3. The portable mobile phone bracket according to claim 1, wherein the second weight reducing hole is provided with a first protrusion axially extending; the first protrusion is provided with a first clamping ring; and the first protrusion is matched with the second weight reducing groove to clamp the upper cover.

4. The portable mobile phone bracket according to claim 1, wherein the second reinforcing rib is provided with a third protrusion configured as an arc.

5. The portable mobile phone bracket according to claim 4, wherein screw holes are formed in the second weight reducing groove; the screw holes are arranged at intervals; location pillars matched with the screw holes are arranged on the first weight reducing groove; and the location pillars are arranged on the first reinforcing rib.

6. The portable mobile phone bracket according to claim 1, wherein a non-slip pad is arranged on the base.

7. A portable mobile phone bracket, comprising:
an upper ring cover;
a lower ring cover;
a supporting plate connected to the upper ring cover via a connection portion; and
a first weight reducing hole formed in the upper cover and a second weight reducing hole formed in the lower cover;
wherein a first clamping groove is formed in the upper cover, the connection portion is inserted into the first clamping groove, a first weight reducing groove is formed in a back surface of the upper cover; and a position of the first weight reducing groove corresponds to a position of the first clamping groove; a second weight reducing groove is formed in the upper cover and a third weight reducing groove is formed in the lower cover; the second weight reducing groove is matched with the third weight reducing groove; the second weight reducing groove circles the upper cover once; and the third weight reducing groove circles the lower cover once; and the third weight reducing groove is provided with a second protrusion; the second protrusion radially extends; the second weight reducing groove is provided with a second clamping groove matched with the second protrusion.

8. The portable mobile phone bracket according to claim 7, wherein the second weight reducing hole is provided with a first protrusion axially extending; the first protrusion is provided with a first clamping ring; and the first protrusion is matched with the third weight reducing groove to clamp the upper cover.

9. The portable mobile phone bracket according to claim 7, wherein the second weight reducing groove is provided with a first reinforcing rib used to strengthen supporting; the second weight reducing hole is provided with a second reinforcing rib used to strengthen supporting; and the second reinforcing rib is connected to the third weight reducing groove.

10. The portable mobile phone bracket according to claim 9, wherein the second reinforcing rib is provided with a third protrusion configured as an arc.

11. The portable mobile phone bracket according to claim 4, wherein screw holes are formed in the third weight reducing groove; the screw holes are arranged at intervals; location pillars matched with the screw holes are arranged on the second weight reducing groove; and the location pillars are arranged on the first reinforcing rib.

* * * * *